United States Patent Office 3,149,958
Patented Sept. 22, 1964

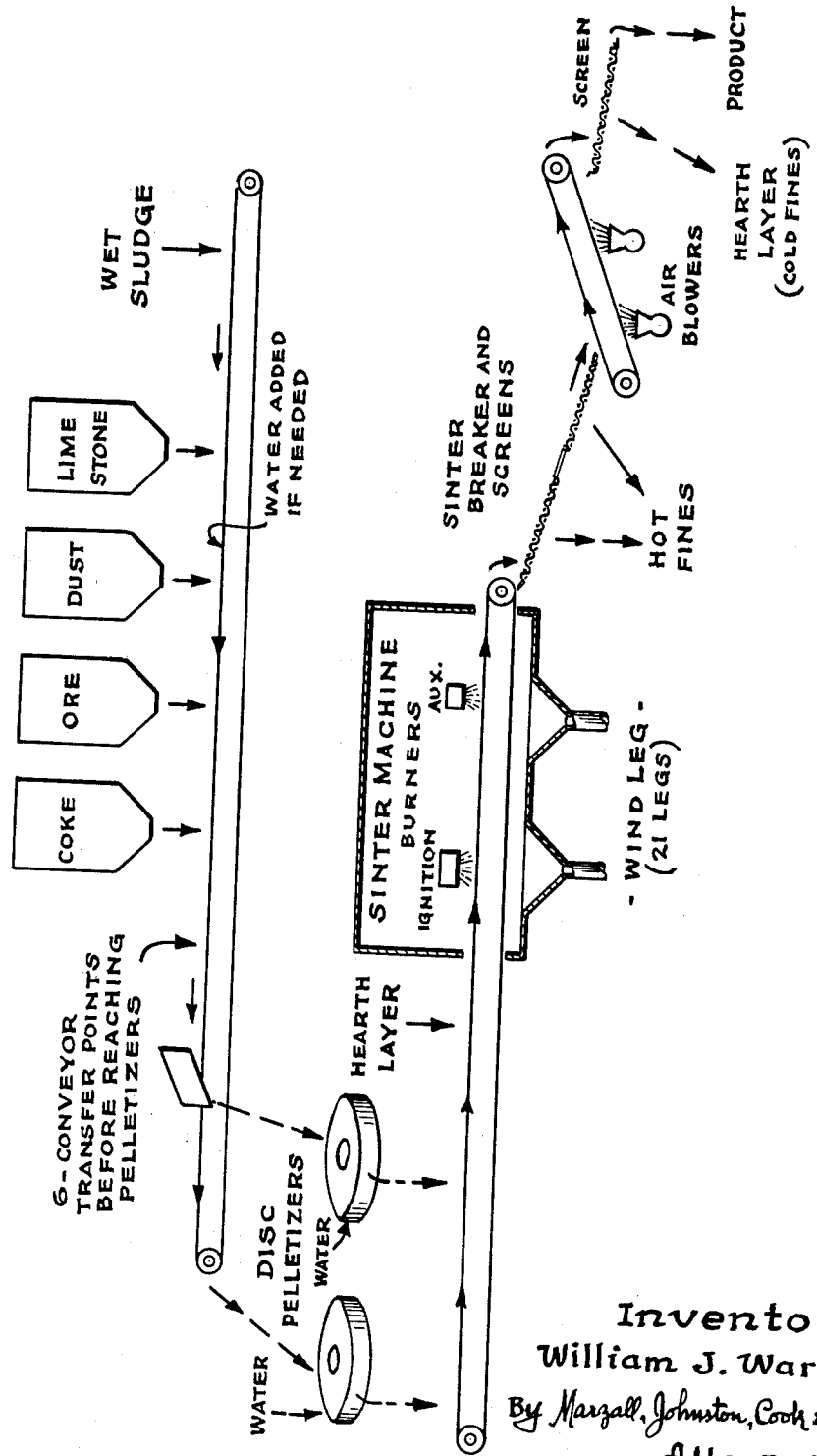

3,149,958
SINTERING PROCESS
William J. Ward, Naperville, Ill., assignor to Nalco Chemical Company, Chicago, Ill., a corporation of Delaware
Filed Apr. 16, 1962, Ser. No. 187,737
8 Claims. (Cl. 75—5)

This invention relates to a method of increasing the efficiency of an iron ore sintering process and improving the product thereof. More particularly, the instant invention is concerned with a method of increasing the size and compactness of iron ore pellets which are to be subsequently fed into a sinter furnace, with the beneficiation added to the iron ore pellets leading to an overall improved sintering process and a more desirable fused iron ore product useful as a blast furnace feed.

With gradual depletion of high-grade iron ore deposits, it has been necessary of late to resort to use of lower grade iron ore deposits and utilization of "tailings" from iron ore processing which have heretofore been discarded and stockpiled. Many difficulties arise through the use of such impure iron ore workings or by-products for example such as fines recovered from blast furnace flue gas. These products cannot be fed directly into a blast furnace due to the fact that their high content of impure materials would cause considerable slag with resultant inefficiency of operation and repeated breakdowns. In addition, many of these iron ore deposits are in such a fine state of aggregation that they would be lost through the flue of the blast furnace long before any liquification into a molten mass could take place. While the resultant flue dust could be collected and reused, the same type of problem would occur with subsequent reuse unless these fine particles were processed into larger, denser masses.

In view of the above, it has been proposed that finely-divided relatively impure iron ore be processed by "firing and fusing" the smaller iron ore particles into larger masses or "clinkers," which products after subsequent break-up into usable chunks may be fed directly into the blast furnace as a feed. Using this type of blast furnace feed, little or no loss by volatilization takes place before ore liquification. The normal procedure in such a process, commonly known as a sintering process, is to combine the finely-divided ore with coke and a calcium carbonate-containing substance in order to form a mixture known as a burden, pelletizing said burden through use of the appropriate machinery, and feeding the resultant pellets into a sinter furnace whereby they are fused into a relatively large mass and then mechanically broken up into usable chunks. In this process the coke is used as the fuel medium during the sintering step and the calcium carbonate-containing material, preferably limestone, is used as a flux. The flux causes the iron ore to melt more readily by dissolving the oxide or surface impurities, thereby increasing the fluidity of the impure iron ore and bringing all of its components into more intimate contact.

As mentioned above, the source of iron ore used in the sintering process may be direct shipments from the mining area. Generally these low grade ores are finely divided, and need little handling prior to the sintering operation. In some cases, however, the impure deposits may need crushing and washing prior to firing. Besides using a source of iron ore direct from the mining area, the sinter burden may be composed of any other source of impure iron as long as these sources are suitable for pelletizing, that is, of a sufficiently fine size to be easily formed into pellets. These iron ore fines in addition to those coming directly from the mining area, may include flue dust from the smelting process, cold and hot fines falling from the sintered mass, and tailings from other iron ore processing. A convenient source of iron ore is found in the use of an iron ore sludge. A preferred source is primarily a concentrated aqueous suspension or slurry of iron ore flue gases which have been collected from the stacks, wetted in gas washers and then concentrated. Other iron ore sludges may be found, for example, in holds of iron ore barges or around iron ore ship loading areas.

In order to form an iron ore pellet or sufficient strength to hold its shape prior to the actual sintering or firing step, it is necessary that water be added to the burden thereby giving it more compactness, and pellet-forming tendency. Water may be added directly to the burden at any point prior to the pelletizing, and/or it may be introduced into the system by use of iron ore sludge.

It is essential, of course, that the burden be available in a form for ready pelletization by means of such machinery as a disk or drum pelletizer. This machinery comprises a rotating inclined surface which agglomerates the burden composite into pellets when the burden is flowed upon the revolving inclined surface. The burden therefore must be capable of being compacted into pellets by virtue of the centrifugal force imparted to the burden by the revolving pelletizers. Therefore, it is essential that the burden have sufficient adhesive qualities in order to form relatively large pellets of sufficient strength to withstand subsequent processing and transfer prior to their sintering.

While ores containing clay impurities have some natural binding tendencies, these ores are also becoming increasingly scarce, with the harder to handle iron ores of relatively low clay content becoming increasingly more important.

Therefore in order to give compression or "green" strength to the pellets with concurrent increase in pellet size, it has been proposed that substances be introduced into the burden in order to act as binders during the pelletizing step and subsequent thereto. Prior art substances such as pickle liquor, lime, starch and other naturally occurring organic materials and the like have been tried, but with little success. These proposed binders either fail to impart the required green strength to the pellets or more commonly fail to increase the pellet size to that sufficient for efficient utilization in the sintering process. Many of these substances gave a barely passable pellet only with increased retention time in the pelletizing process, thus increasing costs by reducing through-put. Another material which has been used as a binder is bentonite, a naturally-occurring clay. However, this material has the important disadvantage of imparting silica to the burden. To combat this problem excessive amounts of flux are required to fuse the silica contained in the bentonite during the sintering process. Then silica is carried through the process and into the blast furnace operation creating relatively large amounts of unusable and deleterious slag.

It would therefore become an advantage to the art if a binder could be introduced into the burden used in a sintering operation, which binder would increase the pellet size of the burden, allow rapid pelletization, and increase the "green" or compression strength of the formed pellets thereby allowing considerable physical handling without breakdown in their size or shape. Another advantage would be realized if this binder was relatively inexpensive, imparted no deleterious impurities into the burden and resultant smelt product and could itself be used as a source of fuel during volatilization in the sinter furnace.

It therefore becomes an object of the invention to provide a method of increasing the efficiency of an iron ore sintering operation and improving the product thereof by addition of an organic binder into the iron ore burden prior to its pelletization.

Another object is to provide an organic binder of a relatively inexpensive nature which can be efficiently fed in low amounts into a burden without introducing impurities which would adversely affect the process of sintering or the resultant products thereof.

Another object of the invention is to provide iron ore pellets having improved green strength and ability to withstand considerable handling prior to their firing and fusing.

In accordance with the invention it has been found that ammonium, alkali or alkaline earth salts of leonardite, a coal-like substance similar to lignite, are extremely useful in acting as a binder for iron ore pellets, thereby increasing the ability of these iron ore composites to be pelletized into relatively large pellet sizes, with the resultant pellets having sufficient compression or green strength to withstand handling and transferring prior to their firing and fusion in a sintering operation.

Leonardite, often found in association with lignite is a specific organic substance named after A. G. Leonard who was associated with its discovery, and is considered more in the nature of a chemical useful in various additive processes rather than as a fuel due to its relatively poor combustibility and B.t.u. content per unit weight. Leonardite is primarily mined from the Harmon bed in Bowman County, North Dakota, and Divide County, North Dakota, and in and around Alpine, Texas. Although physically similar to lignite, leonardite has a much richer oxygen content than does lignite, ranging in oxygen content from 27–33% by weight, whereas lignite contains about 19–20% oxygen by weight.

The high oxygen content of leonardite has been ascribed to the presence of carboxylic acid groups and phenolic groups in the leonardite molecule. Spectro analysis has indicated that leonardite is generically speaking, a mixture of salts of humic acids which upon excitation for such analysis, causes certain distinctive spectra patterns to appear. Although not proved conclusively, leonardite is probably a large aryl carboxylic polymeric molecule. The following structural formula has been proposed as a representative-type molecule defining leonardite. This formula, of course, is not meant to be conclusive but has been tendered in order to show the complexity of problems in defining leonardite other than with reference to its mining source.

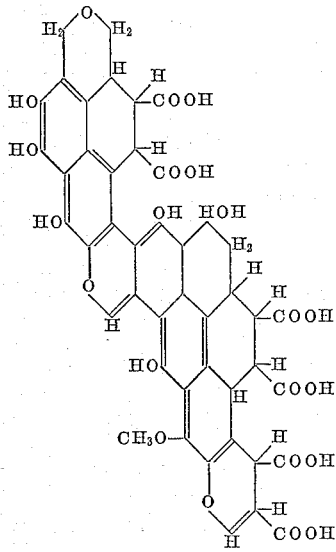

A typical leonardite sample, normally said to be comprised of calcium, sodium, magnesium, potassium, etc., salts of complex organic acid, is partially analyzed as follows:

| Ash | C | H | N | O | CH₃ | CH₃O | CH₃CO |
|---|---|---|---|---|---|---|---|
| 14.01 | 48.75–53.98 | 3.79–4.70 | 1.25 | 31.99 | 1.26 | 0.44 | 0.38 |

The equivalent weight of the above sample of leonardite was determined to be 256.

For the purposes of the invention it has been determined that far better results are achieved when the leonardite has been further reacted with ammonium hydroxide or an alkali metal or alkaline earth metal hydroxide, such as calcium hydroxide, sodium hydroxide or potassium hydroxide, in order to give a product which has a pH greater than 7.0 when measured as a 10% dispersion in water. Preferably samples of leonardite give better results as a binding agent when they have pH's, as a 10% aqueous dispersion, of between 8 and 12. Most preferably, leonardite salts having a pH greater than 9.0, are employed in the pelletizing and sintering operation. It is believed that the higher basic leonardite material has better dispersibility and mixing tendencies when added to the moist sinter burden.

As mentioned above, the burden may contain iron ore deposits coming direct from the mining site, from ore "tailings," flue dust, cold and hot fines from the sinter process itself, or iron ore which may be found in a sludge condition as aqueous iron ore concentrates found naturally or recovered from various processes. For example, flue gases containing entrained flue dust particles may be caught and wetted in gas washers and then concentrated by coagulation-type clarifiers into a relatively concentrated wet sludge which may be employed in the sinter operation. Iron ore from the following minerals may form a part of the burden: magnetite, hematite, limonite, goethite, siderite franklinite, ilmenite, chromite, pyrrhotite, chalcopyrite and pyrite. Any one of these sources of iron ore or any possible combination thereof may be employed according to their availability and particular process set-up of the sinter plant in which they are employed.

The flux material may be chosen from a number of substances, but because of availability and relatively low cost, a calcium carbonate-containing substance is generally employed. Among these, limestone or an impure source of limestone, such as calcite, are admirably suited as flux materials. This latter material is also known as calcspar which is a hexagonal, normally colorless, rock-forming mineral composing both crystalline species, such as iceland spar, corn spar and satin spar and amorphous varieties including chalk, marble, limestone, stalactite, and baryte. Also spongy and flake-like forms, such as mountain milk and schiefer spar may be employed.

Another essential element in the burden is a source of fuel in order to both fire and fuse the burden pellets when passing through the sinter furnace. Generally, coke is employed but any other inexpensive source of fuel may be included in the operation. A particular advantage in the use of leonardite salt as a binder is that concurrent with its action in building up larger pellets and giving greater compression strength is its ability to burn and thereby enhance the fuel value of coke or any other fuel used in the sintering step. A typical sample of leonardite salt has a fuel value of 7,000–8,000 B.t.u./lb. Therefore, the leonardite binder not only helps to form pellets of requisite size and strength, but completely volatilizes in the sintering step thereby acting as a source of fuel without forming any deleterious slag deposits during this particular step of the process.

As outlined above, in order to promote compactness and adhesiveness of the pellets so that they may withstand handling subsequent to their formation, it is necessary that they be moist and in condition for ready and efficient pellet formation. It is necessary, then, that water in some form be added to the burden prior to the pelletization. The added water operates in conjunction with the leonardite salt to give good binding action. This water may be conveniently supplied by use of aqueous ore sludge or may itself be added at any point in the over-all sinter process either before or after the leonardite salt binder has been added to the burden to form the composite.

It is prefererd that the aqueous content of the burden prior to pelletization comprise 2–20% by weight of water based on the weight of the burden. More preferably, the water content of the burden forms from 5% to 20% by weight of the entire mixture. In its most favorable aspect the burden composition comprises 8–15% by weight of an aqueous liquid primarily composed of water. Whether the above percentile weight ranges are based on the weight of the burden alone or the composite comprising the burden and the binder is immaterial due to the relatively insignificant weight of the binder in comparison to the burden weight.

The amount of leonardite salt added to the burden may be varied according to the particular needs of the sinter plant in question. It has been determined that excellent results are obtained when from 0.1–20 pounds of leonardite salt per ton of burden are employed. More preferably, 0.5–10 pounds of leonardite are added per ton of burden with the most preferable results, from a standpoint of efficiency and cost being obtained in the range of 0.5–3.0 pounds per ton. When measured in terms of parts of binder per million parts of burden, it is preferred that the binder be added in a range of from 50–1000 p.p.m.

The leonardite salt may be added at any place prior to the pelletization operation. In the normal operating procedure the finely-divided iron ore in any of its various forms, and the coke and flux material which components when combined with the above required amounts of water comprise the mixture known as a burden, are added to a conveyor belt and transported through numerous transfer points prior to the pelletizing operation. The binder may be added at any spot in the operation, before, during or after addition of any of the components of the burden. It is preferred, however, that the burden be composed first and then the binder be added to the burden in the required amount. Partial mixing is effected by transfer of the burden and the binder, which for convenience sake will be called a composite, when moved along the various routes prior to the pelletization step. Nearly complete mixing is effected just prior to the pelletization and during the pelletization step itself, in order to give a fairly homogeneous iron ore composite.

Any of the many well-known types of pelletizing apparatus may be used in a sinter operation, but a preferred embodiment involves the use of what is known as a revolving disk or revolving drum-type pelletizing machine. In this type of operation the composite comprising the burden and binder is flowed over a revolving disk, retained thereon for a sufficient amount of time, generally only a few seconds or so, to impart a centrifugal force to the composite and form it into numerous agglomerates or pellets. These pellets spinning off the surface of the revolving drum or disk are then caught on another conveyor belt for transfer to the sinter furnace. These revolving metal surfaces are normally set at an angle of inclination ranging from 50° to 60°. Additional water may be added to the rotating pelletizing disk in order to better promote pellet formation.

As mentioned above, the ore-containing materials may also be composed of fines, hot or cold, or flue dust. In another embodiment of the invention these fines are added to the already formed pellets, and are held in contact with the moist adhesive-type pellets prior to entrance into the ignition furnace. A blender may be placed between the sinter furnace and the pelletizer when additional fines are added to the formed pellets, in order to attach the fines more intimately with the moist pellets. Prior to ignition the burden is laid down on a series of traveling grate pallets which enter the ignition furnace.

In another embodiment a supporting layer known as a hearth layer primarily composed of sinter product may be first put down on the pallets. The hearth layer put on top of the grates then receives the sinter burden. The depth of the sinter burden may vary as desired but preferably is from ½ to 2 feet in depth. The burden is transferred through the ignition furnace whereupon ignition of the coke takes place accompanied by the fluxing action of the calcite to form a long, porous, relatively thick layer of iron ore known as a clinker. This clinker is then broken into smaller chunks, cooled and transferred to stock areas or directly to the smelting site. Hot and cold fines are collected at various spots, for example, under the sinter breaker area, and returned for use in subsequent sintering.

The mechanism by which the sodium salt of leonardite accomplishes its pelletizing action, is not known for certain. However it is believed that the binder imparts a degree of adhesiveness to the sinter furnace burden, but even more importantly develops a compressable fluid bond at the particle interfaces of the burden. Since the bonding action is dependent upon formation of thin surface films, rather than upon slurry formation, the amount of necessary moisture comprising a portion of the burden or the composite will be less than normal, which reduction materialy benefits the overall efficiency of the sintering process.

The figure in the drawing is a diagrammatic illustration of a plant layout which may be used to practice the invention.

With specific reference to the drawing, it can be seen that iron ore from three distinct sources, namely, wet sludge, dust or ore fines and finely-divided iron ore directly from the mining area is added to coke and limestone and laid upon a conveyor belt from a series of storage receptacles. The source of leonardite salt binder is not shown, but is normally added from a receptacle positioned between two of the iron ore bins. The burden and the binder are then carried along a series of belt conveyors, and transferred from one conveyor to another approximately five or six times before reaching the pelletizers. This conveying motion and transferring imparts a certain degree of mixing action to the components of the composite. The composite is then split up into two separate portions each of which is fed into a separate disk pelletizer. It is normally convenient at this time to add sufficient water to bring the moisture content within the range of 12–14% by weight. The disk pelletizers are inclined at angles ranging from 50–60°. After the pelletizing has taken place the pellets from the two machines are laid down on separate belts, combined and placed on a single conveyor and transferred to the ignition furnace. A hearth layer of previously sintered material is first laid down upon the traveling grate pallets going into the ignition furnace; upon this layer are placed the pellets. The sintering takes place in the ignition furnace and the huge clinker issuing from the furnace is then broken up mechanically while still hot. The hot fines may be used in subsequent sintering operations. The chunks are then cooled and the fines from these chunks are then screened, leaving behind cold fines which may be used in subsequent operations as part of the burden. The final product existing in relatively large chunks may then be transferred for use in the blast furnace.

In order to determine the efficacy of the invention a field trial was held involving the use of the sodium salt of leonardite. This trial was held in a typical sintering operation employing the type of equipment shown in the drawing. The particular leonardite binder used was made by addition of 35 parts of 50% sodium hydroxide to 100 parts of leonardite which had been obtained from a North Dakota mine. The binder had a pH of 9.6 when measured as a 10% aqueous solution. The caustic was added to the leonardite over a period of 20 minutes and then the product was mulled for an additional 20 minutes until it was uniform.

To feed the leonardite salt a "vibra-screw" feeder, having a feeding capacity of approximately 190 pounds to approximately 1200 pounds of binder per hour, was positioned between two ore bins at the beginning of the sintering operation. The burden in this example consisted of calcite, flue dust, direct ship Mesabi iron ore, and coke fuel. During the trial period it was determined that from 0.5 pound of organic binder per ton of burden to 2.5 pounds per ton gave the best results.

After the burden the binder had been added together to form a composite, the composite was moved up to the disk pelletizers on a series of endless rubber belts with about five or six transfer points in which the composite moved from belt to belt. The two disk pelletizers had angles of inclination of 57.5° and 58.5° respectively, were 19 feet in diameter and had a one minute retention time when run at 10 r.p.m. Sufficient water was added prior to the pelletization step to bring the total content between the range of 10 and 15%.

After leaving the disk pelletizers, the pellets were transferred to a common conveyor belt, mixed with hot fines returning from the sinter machine and deposited on the traveling grate of the sinter machine. The particular sinter machine employed in this test was a gas-fired unit which fused the pellet composite comprising the binder and burden into a continuous clinker. A hearth layer comprising approximately two inches of sinter product was first laid down on the traveling grate pallets composing an endless belt which moved into the gas-fired ignition furnace. Next, 12 inches of composite were laid down on the hearth layer and this entire mass was moved into the ignition furnace.

As soon as the binder was added to the above described continuous process, it was noted that much larger pellets were formed than is normal when no binder is applied. In fact, the average pellet size was much greater than those formed when prior art binders had been employed. Due to the excellent pelletization action, the entire operation was able to be speeded up to an additional 20% rate above that which is considered normal. Also, it was possible to make up the burden so as to comprise as much as 40% flue dust, the utilization of which is a considerable economic advantage. Prior to addition of the composition of the invention flue dust contents in the range of 10–40% based on the weight of the burden tended to have adverse effects on the pelletizing machines and the sintering operation as a whole. In addition to increasing the tonnage through-put approximately 20%, the pellet size was increased about eight-fold when compared to the size of those pellets formed without any binder treatment whatsoever. A two to three times size increase in pellets with corresponding decrease in fines in the burden was noted when compared to a prior art treatment.

In addition to the above advantages derived from the use of the sodium salt of leonardite as binder, it was also noted that the pellets when formed had sufficiently high compression or green strength to withstand handling subsequent to the pelletization operation. A high compaction is necessary in order that the pellets retain their characteristic shape, thereby forming a useful porous clinker when sintered. It was further noted that there was a 25–30% reduction in hot and cold fines produced upon breaking the clinker after sintering. This is believed to be the result of increased porosity in the burden bed as fed into the sinter furnace. The porosity was in turn caused by the greater number of pellets formed in this trial, as well as increase in pellet size. The porosity permits improved access of heating gases to the burden in the sinter furnace, with consequent more complete clinker formation.

Other salts of leonardite, such as the alkali metal or alkaline earth salts may also be employed as binders, giving equally good results with regard to the specific sintering operation defined in the above field test or in other sintering operations which are modifications of the process so illustrated. Using these salts of leonardite for binder purposes, the average size of the pellets may be increased from about 4 to about 200 times when compared to a sintering process which does not involve the use of a leonardite salt binder. As just mentioned above, another advantage that may be realized through the use of the compositions of the invention is the reduction of cold and hot fines which necessarily have to be reprocessed. Using a leonardite salt binder the fines may be reduced from 20 to 100 times when compared to systems involving either no treatment whatsoever or treatment using other prior art binding materials.

As noted in the above field test, ore fines or dust ore particles may be added to the pellets formed. These dust particles are tightly bound to the "seed" pellets through the action of the leonardite salt. This addition of fines to the formed pellets helps to impart greater porosity to the sinter bed giving an improved product for use in smelting.

Many other advantages are realized through use of the leonardite salt binder. For example, a production of larger particles without sacrificing through-put during the actual pelletizing step gives a more porous sinter bed with greater production rates. Moreover, the sinter is of better quality with less burden recycle and a better blast furnace product. Since a lower moisture content is required in the sinter burden, less fuel is required to ignite the burden with resultant substantial economic savings. It has been noted that a more uniform bed is laid down in the sinter furnace due to incorporation of a binder. As discussed above another important advantage that is derived through the use of the leonardite salt is the fuel savings effected through its use. In addition to its binding action the leonardite salt in the pellet may be used as the partial replacement for the coke. Lastly, use of the leonardite salt binder leads to a reduction in atmospheric dust content, since the superior pelletizing action imparted by the chemical keeps the fines in pellet form prior to sintering and prevents their release into the surrounding area.

Surprisingly enough, use of the leonardite directly as mined without subsequent salt formation, gave little or no increase in pellet size and compression strength, nor was the overall efficiency of the sintering operation increased to any appreciable extent.

Desirable leonardite salts, useful as sinter binders, may be prepared by adding 10–70 parts by weight of ammonium, alkali or alkaline earth hydroxides per 100 parts of leonardite in order to achieve a product having a pH greater than 7.0 and more preferably within the higher pH ranges as heretofore stated. Of course, the amount of hydroxide necessary to prepare the basic leonardite salts will depend upon the particular hydroxide used and the particular leonardite source reacted. Mulling or mixing the leonardite with the above basic hydroxides may be effected in times ranging from 5 to 180 minutes.

It will be apparent that many modifications and variations may be eeffcted without departing from the scope of the novel concepts of the present invention.

I claim as my invention:

1. In a method of increasing the efficiency of an iron ore sintering operation and improving the product thereof, the steps which comprise adding together a minor amount of a binder comprising a salt of leonardite with a major amount of a burden, said burden comprising finely divided iron ore, coke, a calcium carbonate-containing material and an aqueous liquid, mixing said binder and said burden to form a composite thereof, pelletizing said composite by flowing said composite upon a revolving surface so as to agglomerate said composite into pellets, heating said pellets for a sufficient time to form a fused mass and finally breaking said mass into smaller units useful as a blast furnace feed.

2. The method of claim 1 wherein in said burden comprises finely divided iron ore, coke, a calcium carbonate-containing material, iron ore sludge, and an aqueous liquid comprising 2–20% by weight of water based on the weight of said burden.

3. The method of claim 2 wherein said burden also includes sinter fines and flue dust.

4. The method of claim 1 wherein said binder is added in an amount ranging from 0.1 pound to 20 pounds per ton of burden.

5. The method of increasing the efficiency of an iron ore sintering operation and improving the product thereof which comprises the steps of adding together a minor amount of a binder comprising an alkali salt of leonardite with a major amount of a burden, said burden comprising finely divided iron ore, coke, limestone, iron ore dust, and water, partially mixing said binder and said burden to form a composite thereof, adjusting the water content of said composite to a range of from 5% to 20% by weight of said composite, pelletizing and further mixing said composite by flowing said composite upon a revolving surface so as to impart a centrifugal force upon said composite and agglomerate said composite into pellets, treating said pellets for a sufficient time to form a fused mass, and finally breaking said mass into smaller units useful as a blast furnace feed.

6. The method of claim 5 wherein the binder comprises 0.1–20 pounds per ton of burden of an alkali salt of leonardite, said salt having a pH of at least 7.0 when dispersed to form a 10% aqueous dispersion, and said burden also includes iron ore fines comprising flue dust and sinter fines.

7. An iron ore pellet useful for sintering and having improved green strength which comprises a major amount of a burden, said burden comprising finely divided iron ore, coke, calcium carbonate-containing material and an aqueous liquid and a minor amount of a binder comprising an alkali salt of leonardite.

8. The iron ore pellet of claim 7 wherein the calcium carbonate-containing material is limestone, the aqueous liquid is water which comprises 5–20% by weight of the pellet, and said binder is present in an amount ranging from 50 to 1000 p.p.m.

References Cited in the file of this patent
UNITED STATES PATENTS
953,701     Glass ------------------ May 17, 1910
FOREIGN PATENTS
444,057     Great Britain ------------ Mar. 5, 1936

UNITED STATES PATENT OFFICE
CERTIFICATE OF CORRECTION

Patent No. 3,149,958 September 22, 1964

William J. Ward

It is hereby certified that error appears in the above numbered patent requiring correction and that the said Letters Patent should read as corrected below.

Column 4, in the table, heading to the fifth column, for "C" read -- O --; column 8, line 61, for "eeffcted" read -- effected --.

Signed and sealed this 2nd day of February 1965.

(SEAL)
Attest:

ERNEST W. SWIDER
Attesting Officer

EDWARD J. BRENNER
Commissioner of Patents